US011649789B2

(12) United States Patent
Lee et al.

(10) Patent No.: US 11,649,789 B2
(45) Date of Patent: May 16, 2023

(54) DUAL PURGE SYSTEM FOR VEHICLE

(71) Applicants: Hyundai Motor Company, Seoul (KR); Kia Corporation, Seoul (KR)

(72) Inventors: Jong Hwan Lee, Seoul (KR); Bu Yeol Ryu, Hwaseong-si (KR); Ju Tae Song, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/658,946

(22) Filed: Apr. 12, 2022

(65) Prior Publication Data

US 2023/0013738 A1 Jan. 19, 2023

(51) Int. Cl.
*F02M 25/08* (2006.01)
*F02M 35/10* (2006.01)

(52) U.S. Cl.
CPC .. *F02M 25/0836* (2013.01); *F02M 35/10222* (2013.01)

(58) Field of Classification Search
CPC ........... F02M 25/0836; F02M 25/0872; F02M 25/089; F02M 35/10222
See application file for complete search history.

(56) References Cited

U.S. PATENT DOCUMENTS

| | | | | |
|---|---|---|---|---|
| 2,631,774 A | * | 3/1953 | Plummer, Jr. | ............ F04F 5/46 417/198 |
| 9,863,379 B2 | | 1/2018 | Heinrich et al. | |
| 10,145,339 B1 | * | 12/2018 | Werner | ............ F02M 35/10222 |
| 10,280,876 B2 | | 5/2019 | Lee | |
| 10,697,400 B2 | * | 6/2020 | Kawanishi | ......... F02M 25/0854 |
| 2009/0290994 A1 | * | 11/2009 | Kieninger | ............... F04F 5/463 417/198 |
| 2011/0186020 A1 | * | 8/2011 | Makino | .................. F02M 33/02 123/521 |
| 2012/0247438 A1 | * | 10/2012 | Konohara | ............ F01M 13/022 123/574 |
| 2016/0177892 A1 | | 6/2016 | Heinrich et al. | |
| 2016/0305377 A1 | * | 10/2016 | Stefaniak | ......... F02M 35/10222 |
| 2017/0138277 A1 | * | 5/2017 | Zhang | ....................... F02D 9/14 |
| 2018/0038321 A1 | * | 2/2018 | Myers | ................. F02M 25/0872 |
| 2018/0087476 A1 | * | 3/2018 | Amemiya | ............... F02B 37/24 |
| 2019/0234294 A1 | * | 8/2019 | Sager | ................. F02M 25/0836 |

(Continued)

FOREIGN PATENT DOCUMENTS

KR 1020140056270 A 5/2014

*Primary Examiner* — Logan M Kraft
*Assistant Examiner* — Anthony L Bacon
(74) *Attorney, Agent, or Firm* — Slater Matsil, LLP

(57) ABSTRACT

A dual purge system for a vehicle includes an ejector including a drive inlet section connected to a first end of a main body section, a suction inlet section connected to a first side of the main body section, an outlet section coupled to an intake passage section, a nozzle section, and a diffuser, wherein the diffuser communicates with internal passages of the main body section and the outlet section and has a larger passage cross-sectional area than a channel cross-sectional area of an outlet of the nozzle section, wherein a driving fluid flows through the drive inlet section, in response to a negative pressure being produced in the main body section by the driving fluid, the suction inlet section suctions a fuel evaporation gas from a canister, and the outlet section discharges the driving fluid and the fuel evaporation gas.

20 Claims, 9 Drawing Sheets

(56) References Cited

U.S. PATENT DOCUMENTS

| | | | |
|---|---|---|---|
| 2019/0301402 A1* | 10/2019 | Calavin | F02M 37/0076 |
| 2020/0291902 A1* | 9/2020 | Lee | F02B 37/16 |
| 2021/0172410 A1* | 6/2021 | Kim | F02M 25/0836 |
| 2021/0388797 A1* | 12/2021 | Kim | F02M 25/0836 |
| 2022/0082070 A1* | 3/2022 | Kato | F02M 35/10157 |
| 2022/0090565 A1* | 3/2022 | Diamond | F02M 25/089 |
| 2022/0290621 A1* | 9/2022 | Kiku | F02M 35/1038 |

* cited by examiner

DUAL PURGE SYSTEM FOR VEHICLE

CROSS-REFERENCE TO RELATED APPLICATIONS

This application claims the benefit of Korean Patent Application No. 10-2021-0092164, filed on Jul. 14, 2021, which application is hereby incorporated herein by reference.

TECHNICAL FIELD

The present disclosure relates to a dual purge system for a vehicle.

BACKGROUND

In a fuel tank of a vehicle, a gas produced by evaporation of fuel due to various factors, i.e., a fuel evaporation gas including fuel components such as hydrocarbon (HC), is generally produced. When discharged to the outside with no change, the fuel evaporation gas in the fuel tank causes air pollution.

Therefore, to prevent the air pollution, a fuel evaporation gas treatment system for burning the fuel evaporation gas in an engine is provided to a vehicle. The fuel evaporation gas treatment system includes a canister that collects and stores the fuel evaporation gas from the fuel tank.

In the vehicle, the fuel evaporation gas in the fuel tank is introduced and accumulated in the canister along with air passing through an air filter. When a purge control solenoid valve (PCSV) is opened by a control signal of a control unit, the fuel components of the fuel evaporation gas accumulated in the canister are suctioned into an engine intake system, and are directed to a combustion chamber.

The canister is configured such that the inside of a case thereof is filled with an adsorbent material that can adsorb the fuel components of the fuel evaporation gas moving from the fuel tank, and activated carbon is widely used as the adsorbent material. The activated carbon functions to adsorb hydrocarbon (HC) etc. of the fuel components of the fuel evaporation gas flowing into the case of the canister.

This canister adsorbs the fuel components onto the adsorbent material in a state in which an engine is stopped, and desorbs the fuel components adsorbed onto the adsorbent material by a pressure of air suctioned from the outside thereof (the atmosphere) when the engine runs, so that the desorbed fuel components are configured to be supplied to the engine intake system along with air.

An operation of suctioning the fuel components collected by the canister into the engine through a purge line is referred to as a purge operation, and the fuel evaporation gas suctioned from the canister into the engine is referred to as a purge gas. This purge gas may be referred to as a gas in which air is mixed with the fuel components, such as hydrocarbon, desorbed from the adsorbent material of the canister.

Further, the PCSV for controlling the purge operation is installed on the purge line that provides connection between a purge port of the canister and the engine intake system. This PCSV is a valve that is opened at the time of the purge operation while the engine is driven, and purges the fuel components collected by the canister using the engine intake system through the opened PCSV along with air, and burns the purged results in the engine.

The PCSV is a valve that is controlled by a control unit, for instance an engine control unit (ECU). To control the fuel evaporation gas, depending on a driven state of the vehicle, control of opening/closing the PCSV (to turn on/off the purge operation) or adjusting the degree of opening of the PCSV is performed.

While the engine is driven, the PCSV is opened by the control unit, and a suction pressure, i.e., an engine negative pressure, is applied from the engine intake system to an internal space of the canister through the purge port of the canister. In this case, air is suctioned through an atmospheric port of the canister, and the fuel components, which are desorbed from the adsorbent material by the suctioned air, are discharged through the purge port of the canister, and are suctioned into the engine.

For this purge operation of allowing air in the atmosphere to be suctioned into the canister and allowing the fuel components such as hydrocarbon to be desorbed from the adsorbent material inside the canister by the suctioned air and to be suctioned into the engine, the engine negative pressure should be applied to the internal space of the canister through the purge line and the purge port.

However, in vehicles equipped with a turbocharged engine, a negative pressure of the engine intake system including an intake manifold is relatively low, or when a turbocharger is operated, a positive pressure rather than a negative pressure is formed in the engine intake system, and the purge operation of the canister is not easy.

Recently, to meet the trend of engine downsizing, use of the turbocharged engine equipped with a turbocharger for improving the fuel efficiency and enhancing the output has increased. In the case of the turbocharged engine, when the turbocharger is operated (i.e., the engine is supercharged), a positive pressure is formed in an intake manifold, and thus the purge gas is not suctioned by a negative pressure. Thus, an existing single purge system cannot be used, and a dual purge system should be used.

Because the typical purge operation varies depending on driving conditions of the engine (for example, when the engine runs idle, the purge operation is not performed due to combustion stability, if possible), and is mainly performed using an intake-side negative pressure, the possibility of the purge operation is determined based on whether a sufficient negative pressure has been formed at the intake side. If the sufficient negative pressure has been formed at the intake side, the purge operation needs to be performed as often as possible such that the fuel components should be removed inside the canister.

However, in the case of the turbocharged engine (i.e., the supercharged engine), an operation area in which a purge function can be performed is limited because of the turbocharged operation (supercharge). In the downsized engines, a required frequency of supercharge is further increased, and thus a point in time and a period capable of purging the fuel components collected in the canister are further limited.

Especially, when a vehicle equipped with the turbocharged engine, i.e., a gasoline turbo vehicle, travels on an uphill road under high-temperature conditions, an amount of evaporation of fuel increases because a temperature of the fuel is high. In this case, if the fuel evaporation gas cannot be purged because a positive pressure rather than a negative pressure is formed in the intake manifold, the fuel evaporation gas in the canister is put in a supersaturated state, and can be discharged outward from the canister.

Consequently, a strong fuel smell occurs at a vehicle, which may cause a user to be dissatisfied with product quality of the vehicle. The fuel is condensed in the canister, which leads to the deterioration of the canister performance and a violation of regulations.

Therefore, a dual purge system is widely used instead of an existing single purge system in the turbocharged engine in view of the foregoing. In this dual purge system, a negative pressure is forcibly formed through an ejector when a turbocharger is operated, and a purge gas (which is the fuel evaporation gas in the canister) is suctioned into an upstream end of a compressor at a position before supercharge, i.e., a position before compression.

FIG. 1 is a sectional view illustrating a conventional ejector used in a dual purge system. As illustrated, an ejector 1 includes a main body section 2, and a drive inlet section 3, a suction inlet section 4, and an outlet section 5 which are pipe portions connected to the main body section 2. In this way, the ejector 1 has a structure in which the three pipe portions are connected to the main body section 2. One of the three pipe portions is the drive inlet section 3 into which a driving fluid flows, another is the suction inlet section 4 into which a suctioned fluid (a purge gas) flows, and the other is the outlet section 5 to which the driving fluid and the suction fluid are discharged in a mixed state.

In the ejector 1, a nozzle 6 is located in an internal space of the main body section 2. The nozzle 6 is formed at an end of the drive inlet section 3. In this case, a channel cross-sectional area of the nozzle 6 has a structure made smaller than an internal passage cross-sectional area of the drive inlet section 3. Further, the internal space of the main body section 2 communicates with an internal passage of a diffuser 7. In the conventional ejector, the diffuser 7 is formed in the outlet section 5. Further, the diffuser 7 in the conventional ejector 1 may be considered as a portion where an internal passage cross-sectional area of the diffuser 7 is larger than the channel cross-sectional area of the nozzle 6.

In the ejector 1, the internal space of the main body section 2 becomes a space in which a driving fluid (air) passing the drive inlet section 3 and a suction fluid (canister purge gas) passing the suction inlet section 4 are gathered and mixed together. A suction section 2a, which is a portion connected by the suction inlet section 4, is provided at one side of the main body section 2, and a check valve 8 is installed between an internal space of the suction section 2a and the internal passage of the suction inlet section 4. The check valve 8 serves to allow a fluid to flow from the suction inlet section 4 to the main body section 2 alone, and to stop a fluid from flowing from the main body section 2 to the suction inlet section 4.

Further, the drive inlet section 3 of the ejector 1 is connected to an intake passage section (e.g., a downstream end-side intake hose) adjacent to a downstream end of the compressor of the turbocharger (downstream from the compressor in a direction of air flow) through a recirculation line, and a purge line extending from the purge port of the canister is connected to the suction inlet section 4 of the ejector 1. In this case, the outlet section 5 of the ejector 1 is connected to an intake passage section (e.g., a front end-side intake hose) 9 adjacent to a front end of the compressor of the turbocharger (upstream from the compressor in the direction of air flow).

Thus, the driving fluid in the ejector 1 is compressed by the compressor, and then becomes some of the air supplied to the drive inlet section from the intake passage section through the recirculation line, i.e., some of supercharged air supplied to the engine. Further, the fluid suctioned into the ejector, i.e., the suctioned fluid, becomes the fuel evaporation gas (the purge gas) that is collected in the canister and is suctioned into the suction inlet section through the purge line.

Thereby, when the turbocharger is operated, the compressor located adjacent to the intake hose suctions and compresses air, and the compressed air is configured to be supplied to the combustion chamber of the engine through a throttle valve (air supercharge). In this case, some of the air compressed by the compressor is supplied to the drive inlet section 3 of the ejector 1 from the intake passage section (the intake hose) adjacent to the downstream end of the compressor through the recirculation line.

In addition, the air (the driving fluid) supplied to the drive inlet section 3 flows through the nozzle 6 past the internal passage of the drive inlet section at a high speed. The air passing the nozzle 6 is discharged to the internal space of the main body section 2, goes past the internal passage of the diffuser 7, and is discharged to the intake passage section (the intake hose) 9 adjacent to the upstream end of the compressor.

In this case, a negative pressure is produced in the internal space of the main body section 2, i.e., in a space between the nozzle 6 and the diffuser 7. This negative pressure is applied to the internal passage of the suction inlet section 4 through the internal space of the suction section 2a. The fuel evaporation gas (the purge gas) in the canister is suctioned into the suction inlet section 4 through the purge line by the negative pressure applied in this case.

The fuel evaporation gas (the purge gas or the suctioned fluid) suctioned into the suction inlet section 4 in this way is suctioned into the internal space of the main body section 2 past the check valve 8 and the internal space of the suction section 2a, is then mixed with the air that is the driving fluid flowing through the nozzle, and is discharged to the intake passage section (the intake hose) 9 adjacent to the upstream end of the compressor through the internal space of the diffuser 7. Then, the fuel evaporation gas is suctioned into the compressor from the intake passage section along with air, is supplied to the engine along with the air (the supercharged air) compressed by the compressor, and is subjected to combustion.

In this dual purge system, the ejector 1 may be installed on the intake hose of the upstream end of the compressor as well as an air cleaner of the upstream end of the compressor. Therefore, the intake passage section 9 on which the ejector 1 is installed refers to a passage portion through which suctioned air flows including the intake hose or the air cleaner.

Meanwhile, in the fuel evaporation gas treatment system for the vehicle to which the dual purge system is applied, a function capable of diagnosing abnormality of the dual purge system should be secured. In this case, as illustrated in FIG. 2, the abnormality of the dual purge system includes a state in which the outlet section 5 of the ejector 1 is demounted and separated from the intake passage section 9.

As described above, when the ejector 1 is demounted and separated from the intake passage section 9, this should be diagnosed as an abnormality, and thus a follow up process for coping with the abnormality should be advanced. Nevertheless, the conventional ejector cannot diagnose the abnormal state in which the outlet section 5 is demounted and separated from the intake passage section 9.

That is, because a space adjacent to an outlet of the nozzle 6 in the internal space of the main body section 2, i.e., a space between the nozzle 6 and the diffuser 7 is located adjacent to the periphery of the suction section 2a into which the fuel evaporation gas is suctioned, and particularly the diffuser 7 downstream from the nozzle 6 in the direction of fluid flow is located in the ejector 1, even if the outlet section 5 is separated from the intake passage section 9, the suctioned fuel evaporation gas in the ejector 1 may be discharged from the outlet section 5 through the diffuser 7 along with the air flowing through the nozzle 6.

In this case, because the outlet section 5 is separated from the intake passage section 9, the fuel evaporation gas discharged through the outlet section is discharged to the atmosphere along with air. Consequently, the purge operation in which the fuel evaporation gas is discharged to the atmosphere through the outlet section 5 is performed.

In this way, despite the abnormal state in which the conventional ejector 1 is demounted and separated from the intake passage section 9, the abnormality of the ejector cannot be diagnosed. Thus, there is a problem that the fuel evaporation gas purged in the canister in a state in which the ejector is diagnosed as being normally operated is discharged to the atmosphere. That is, the abnormal state in which the conventional ejector is demounted from the intake passage section cannot be diagnosed, and thus the fuel evaporation gas may be discharged to the atmosphere when the ejector is demounted. As a result, environment and safety problems, problems such as dissatisfaction with regulations, etc. are caused.

SUMMARY

The present disclosure relates to a dual purge system for a vehicle. Particular embodiments relate to a dual purge system for a vehicle in which an ejector and an intake passage section are structurally improved such that an abnormal state in which an outlet section of the ejector is demounted and separated from the intake passage section can be diagnosed.

Embodiments of the present disclosure can solve problems associated with the prior art.

An embodiment of the present disclosure provides a dual purge system for a vehicle in which an ejector and an intake passage section are structurally improved such that an abnormal state in which an outlet section of the ejector is demounted and separated from the intake passage section can be diagnosed.

According to an embodiment of the present disclosure, a dual purge system for a vehicle includes an ejector which has a nozzle section through which a driving fluid supplied through a drive inlet section flows, and in which, when a negative pressure is produced in a main body section by the driving fluid that flows through and moves the nozzle section, a fuel evaporation gas is suctioned from a canister, which is connected through a purge line, through a suction inlet section. An outlet section of the ejector, to which the driving fluid flowing through the nozzle section in the ejector and the fuel evaporation gas suctioned through the suction inlet section are discharged, is coupled to an intake passage section of an engine intake system, and a diffuser, which communicates with internal passages of the main body section and the outlet section of the ejector and has a larger passage cross-sectional area than a channel cross-sectional area of an outlet of the nozzle section is formed in the intake passage section.

In an embodiment of the present disclosure, the nozzle section may be formed in a tube shape that extends along an inside of the main body section from one end toward the other end of the main body section, and a suction section to which the suction inlet section is connected in the main body section may be formed at a position of the one end of the main body section.

Further, the main body section may be provided in a pipe shape of a fixed length. The drive inlet section communicating with an internal passage of the nozzle section may be connected to the one end of the main body section, and the outlet section may be connected to the other end of the main body section.

Further, an end of the nozzle section which has an outlet may be located in the outlet section connected to the other end of the main body section.

Further, the nozzle section may have a tapered shape in which the cross-sectional area of an internal passage thereof is gradually reduced toward an end thereof at which the outlet thereof is located.

Further, the intake passage section may be a suctioned air passage portion through which air suctioned by a compressor of a turbocharger flows and which is located at an upstream end of the compressor.

Further, the drive inlet section may be connected to the intake passage section of a downstream end of the compressor through a recirculation line so as to allow air compressed by the compressor of the turbocharger to be supplied thereto.

Further, a recessed insertion section into which the outlet section of the ejector is insertable may be formed in the intake passage section, and the outlet section of the ejector may be coupled to the intake passage section in a state inserted into the insertion section of the intake passage section.

Further, the diffuser may be formed to pass through a wall of the intake passage section from the insertion section, and an internal passage of the diffuser may communicate with an inside of the intake passage section.

Further, the diffuser may have a portion whose channel cross-sectional area is gradually reduced from an inlet portion thereof, which is connected to an outlet of the outlet section of the ejector, toward an outlet thereof.

In the dual purge system for a vehicle according to embodiments of the present disclosure, an internal structure of an ejector is improved such that a diffuser, which communicates with a channel of a nozzle of the ejector and has an enlarged passage cross-sectional area compared to a channel cross-sectional area of the nozzle, is formed in an intake passage section to which an outlet section of the ejector is connected, and such that a suction section, which is a space into which a fuel evaporation gas is suctioned through a suction inlet section of a main body section of the ejector, and the nozzle are disposed at positions apart from each other above a fixed distance. Thereby, an abnormal state in which the outlet section of the ejector is demounted and separated from the intake passage section can be diagnosed.

In addition, in the dual purge system according to embodiments of the present disclosure, in the abnormal state in which the ejector is demounted and separated from the intake passage section, even if compressed air that is a driving fluid is supplied to the ejector, suction and atmospheric discharge of the fuel evaporation gas in a canister are made impossible at the ejector.

BRIEF DESCRIPTION OF THE DRAWINGS

The above and other features of embodiments of the present disclosure will now be described in detail with reference to certain exemplary embodiments thereof illustrated in the accompanying drawings which are given hereinbelow by way of illustration only, and thus are not limitative of the present disclosure, in which.

DETAILED DESCRIPTION OF ILLUSTRATIVE EMBODIMENTS

Figure 1:
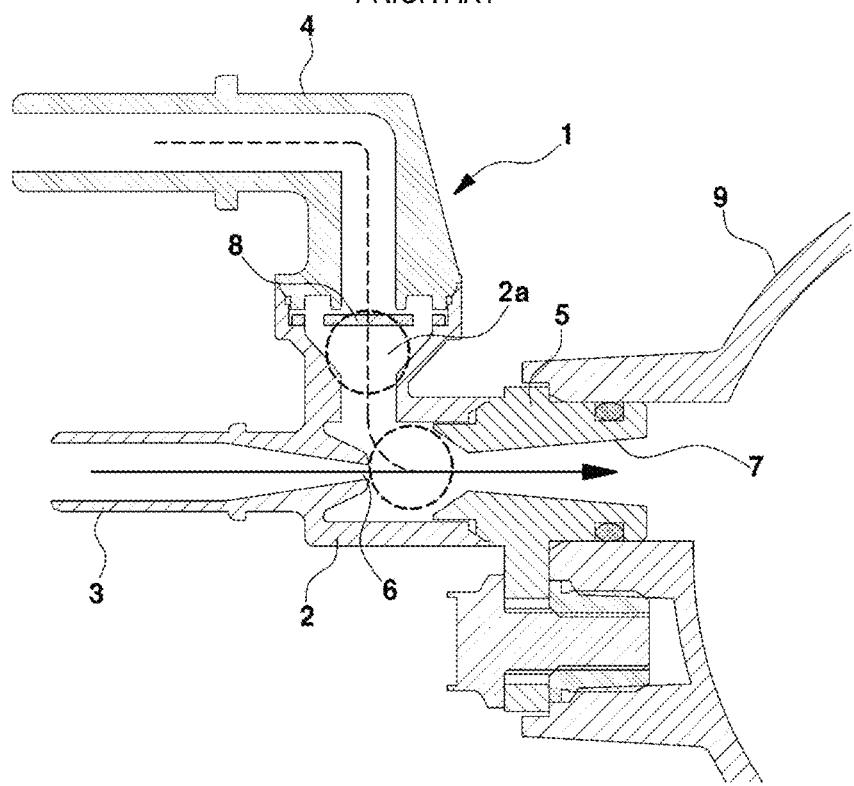
FIG. 1 is a sectional view illustrating a conventional ejector used in a dual purge system.
Figure 2:
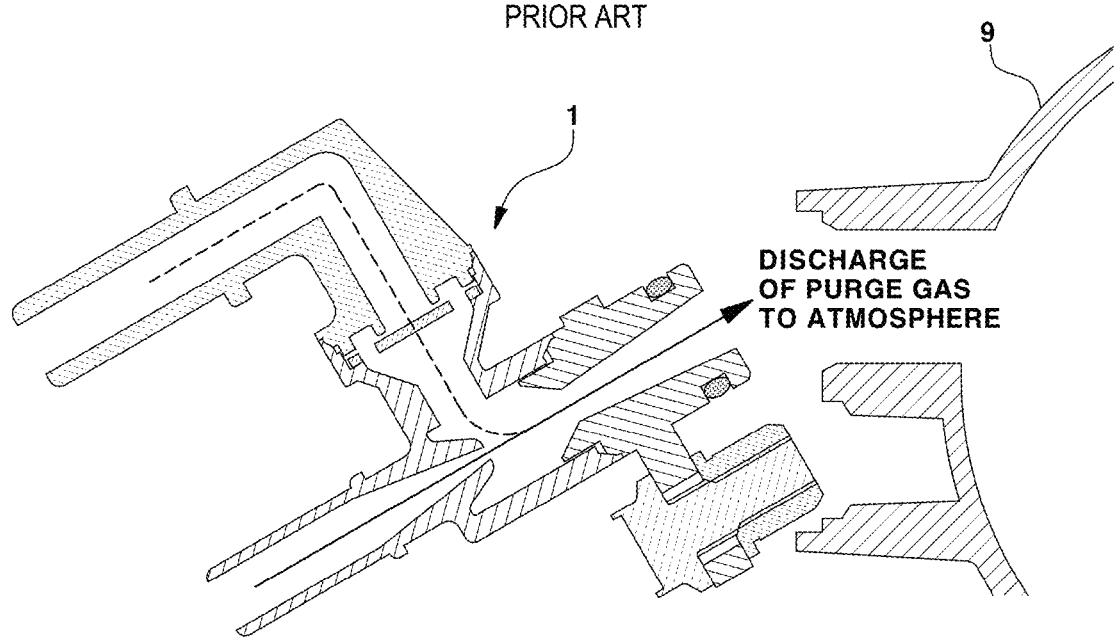
FIG. 2 is a view illustrating an abnormal state in which a conventional ejector is demounted from an intake passage section.

Specific structural and functional descriptions disclosed in the embodiments of the present disclosure are merely given by way of example for the purpose of describing the embodiments based on the subject matter of the present disclosure, and the embodiments based on the subject matter of the present disclosure may be carried out in various ways. Further, it should be understood that the embodiments based on the subject matter of the present disclosure should not be construed as being limited to the embodiments set forth herein, but are intended to cover all modifications, equivalents, and alternatives falling within the idea and technical scope of the present disclosure.

It will be understood that, although the terms first, second, etc. may be used herein to describe various components, these components should not be limited by these terms. These terms are only used to distinguish one component from another. For example, a first component may be termed a second component and, similarly, a second component may be termed a first component, without departing from the scope of rights based on the subject matter of the present disclosure.

It will be understood that when any component is referred to as being "connected" or "coupled" to another component, it can be directly connected or coupled to the other component or intervening components may be present. In contrast, it will be understood that when any component is referred to as being "directly connected" or "directly coupled" to another component, no intervening components are present. Other words used to describe the relationship between components should be interpreted in a like fashion (e.g., "between" versus "directly between," "adjacent" versus "directly adjacent," etc.).

Throughout the specification, like reference numerals are used to indicate like components. Meanwhile, the terminology used herein is for the purpose of describing embodiments only, and is not intended to be limiting of the present disclosure. As used herein, the singular forms are also intended to include the plural forms unless the context clearly indicates otherwise. The terms "comprises" and/or "comprising" used herein specify the presence of stated components, steps, operations, and/or elements, but do not preclude the presence or addition of one or more other components, steps, operations, and/or elements thereof.

Embodiments of the present disclosure provide a dual purge system for a vehicle in which an ejector and an intake passage section are structurally improved such that an abnormal state in which an outlet section of the ejector is demounted and separated from the intake passage section can be diagnosed.

In the dual purge system according to embodiments of the present disclosure, a diffuser, which communicates with internal passages of a main body section and the outlet section of the ejector and has an enlarged passage cross-sectional area compared to a channel cross-sectional area of an outlet of the nozzle section, is formed in the intake passage section to which the outlet section of the ejector is connected. In this way, in the dual purge system according to embodiments of the present disclosure, because the diffuser is formed in the intake passage section, the ejector and the diffuser can be separated when the outlet section of the ejector is separated from the intake passage section.

Furthermore, in the dual purge system according to embodiments of the present disclosure, an internal structure of the ejector is improved such that a suction section, which is a space into which a fuel evaporation gas is suctioned through the suction inlet section of the main body section of the ejector, and an outlet of the nozzle section are disposed at positions apart from each other above a fixed distance.

Consequently, in the dual purge system according to embodiments of the present disclosure, when the outlet section of the ejector is separated from the intake passage section, even if air that is a driving fluid flows through the nozzle section of the ejector at a high speed and is discharged from the nozzle section, a negative pressure is not produced in an internal space of the ejector, and thus a fuel evaporation gas (a canister purge gas or a suctioned fluid) in the canister is not suctioned through the suction inlet section. Therefore, a problem that the fuel evaporation gas is discharged into the atmosphere as in the conventional ejector can be solved.

A configuration of the dual purge system according to embodiments of the present disclosure will be described in greater detail with reference to the drawings.

Figure 3:
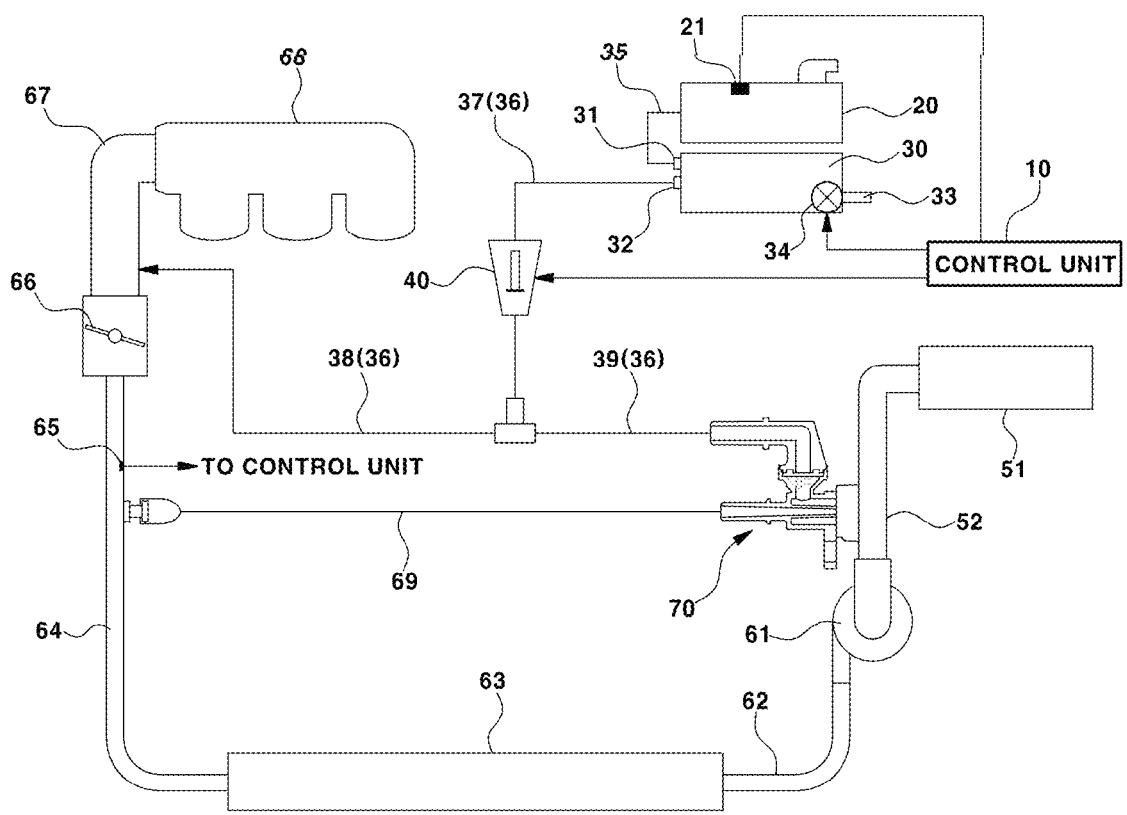
FIG. 3 is a view illustrating a configuration of a fuel evaporation gas treatment system to which a dual purge system according to an embodiment of the present disclosure is applied.
Figure 4:
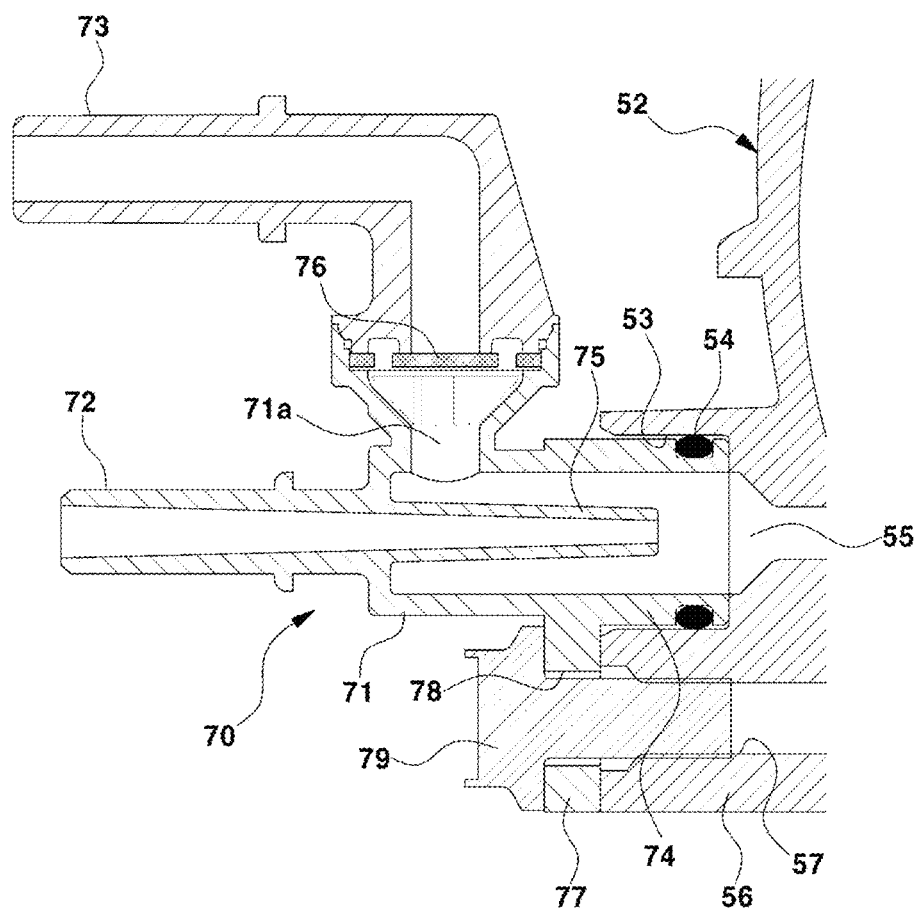
FIG. 4 is a sectional view illustrating an ejector and an intake passage section in a dual purge system according to an embodiment of the present disclosure.
Figure 5:
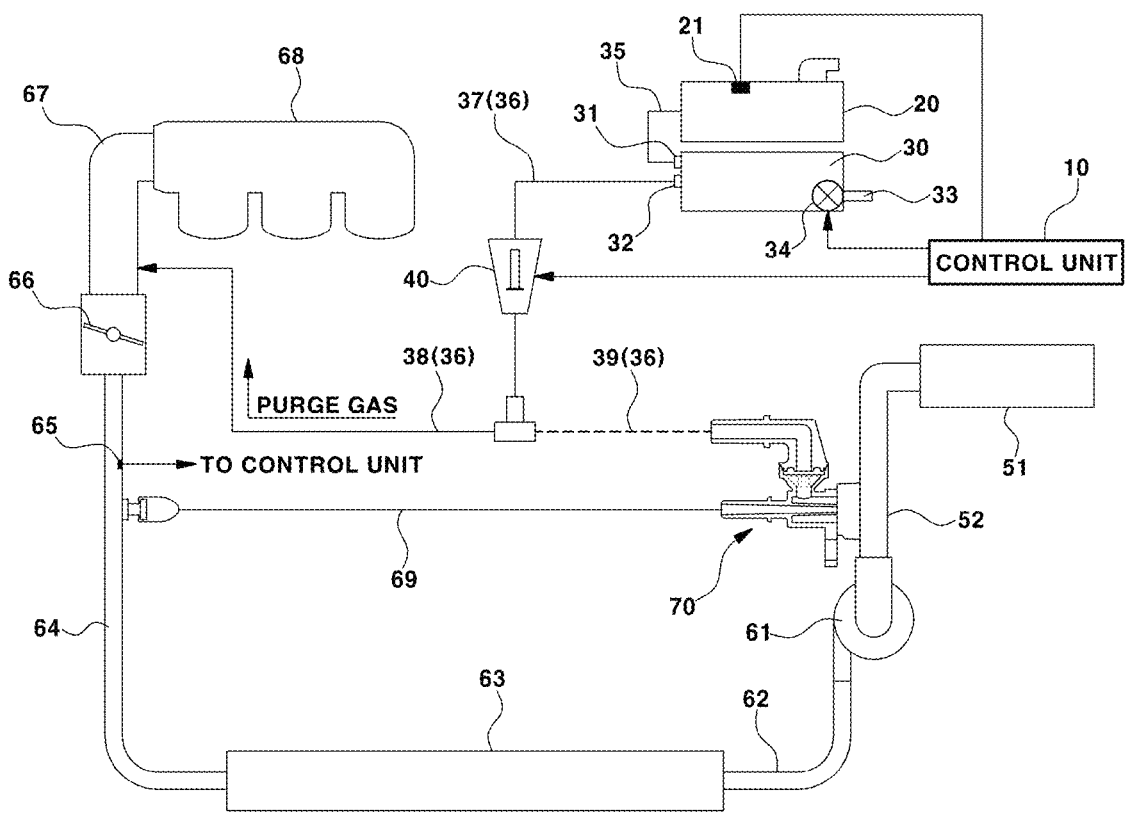
FIGS. 5 and 6 are views illustrating an operation state of a dual purge system according to an embodiment of the present disclosure.
Figure 6:
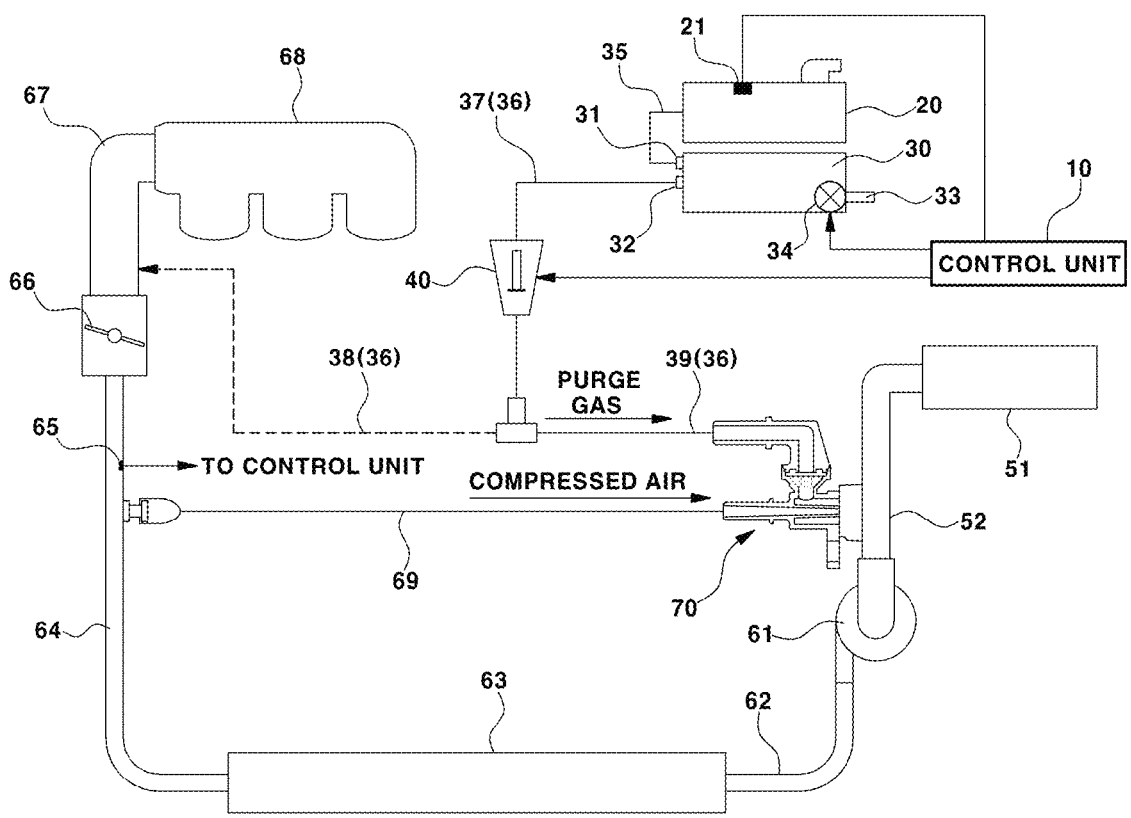

FIG. 3 is a view illustrating a configuration of a fuel evaporation gas treatment system to which a dual purge system according to an embodiment of the present disclosure is applied, and FIG. 4 is a sectional view illustrating an ejector and a diffuser of an intake passage section in a dual purge system according to an embodiment of the present disclosure. Further, FIGS. 5 and 6 are views illustrating an operation state of a dual purge system according to an embodiment of the present disclosure.

As illustrated in FIG. 3, a fuel evaporation gas treatment system to which a dual purge system is applied includes a canister 30 that adsorbs and collects a fuel evaporation gas (an HC gas) produced in a fuel tank 20, a canister close valve (CCV) 34 that opens/closes an atmosphere side of the canister 30, and a purge control solenoid valve (PCSV) 40 that opens/closes a purge line 36, which is a line between the canister 30 and an engine intake system, or adjusts an opening degree of the line.

The CCV 34 and the PCSV 40 are valves controlled by a control unit 10. Here, the control unit 10 may be an engine control unit (ECU).

A case of the canister 30 is filled with an adsorbent material (e.g., activated carbon) that adsorbs a fuel evaporation gas. The case of the canister 30 includes a loading port 31 which is connected to the fuel tank 20 via a loading line 35 and into which a fuel evaporation gas flows from the fuel tank 20, a purge port 32 that is connected to the engine intake system via the purge line 36 and sends a fuel evaporation gas toward an engine, and an atmospheric port 33 into which air in the atmosphere is suctioned. The CCV 34 may be installed on the atmospheric port 33 or an atmospheric line that is a line connected to the atmospheric port.

In FIG. 3, reference numeral 61 indicates a compressor of a turbocharger. The compressor 61 suctions air through an air cleaner 51 and an intake passage section (e.g., an intake hose) 52, compresses the air, and sends the compressed air to the engine intake system. In this case, a discharge port of the compressor 61 is connected to an inlet of an intercooler 63 through an intercooler hose 62 that is an intake passage section, and an outlet of the intercooler 63 is connected to a throttle valve 66 through an intake passage section (an intake hose) 64. Further, the throttle valve 66 is connected to a surge tank 68 of the engine through an intake passage 67.

Consequently, when the compressor 61 suctions air through the intake passage section 52 and compresses and sends the air when a turbocharger is operated, the air compressed by the compressor 61 flows to the throttle valve 66 along the intake passage section 64 via the intercooler 63, flows through the throttle valve 66, and is supplied to a combustion chamber of the engine through the intake passage 67 and the surge tank 68.

The fuel evaporation gas treatment system of a dual purge type, i.e., the dual purge system, includes an ejector 70 that is connected to the purge port 32 of the canister 30 through the purge line 36. In this case, the purge line 36 of the dual purge system may be configured to include a main purge line 37 that is connected to the purge port 32 of the canister 30, and a first purge line 38 and a second purge line 39 that branch off from the main purge line 37.

The PCSV 40 controlled to open/close a line by the control unit (the ECU) 10 may be installed on the main purge line 37, and the first purge line 38 may be connected to the intake passage 67 between a downstream end of the throttle valve 66 of the engine intake system and an upstream end of the surge tank 68.

Further, the second purge line 39 is connected to a suction inlet section 73 of the ejector 70 (see FIG. 4). Here, although not illustrated on the first purge line 38 and the second purge line 39 in the drawing, a check valve preventing a fuel evaporation gas from flowing back to the main purge line 37 and the canister 30 may be installed.

In the dual purge system according to an embodiment of the present disclosure, the ejector 70 includes, as illustrated in FIG. 4, a main body section 71, and a drive inlet section 72 and a suction inlet section 73 that are pipe portions connected to the main body section 71. The main body section 71 of the ejector 70 is formed in a pipe shape that is elongated at a fixed length. In this case, the drive inlet section 72 is connected to one end of the main body section 71. Further, an outlet section 74 is connected to the other end of the main body section 71, and the outlet section 74 is coupled to the intake passage section 52 at a downstream end of the compressor 61.

In the ejector 70, the drive inlet section 72 is an inlet portion into which air (supercharged air) as a driving fluid compressed by the compressor 61 flows, and the suction inlet section 73 is an inlet portion into which a fuel evaporation gas (a purge gas) as a suctioned fluid collected in the canister 30 is suctioned. Further, the outlet section 74 is an outlet portion to which the air as the driving fluid and the fuel evaporation gas as the suctioned fluid are discharged in a mixed state.

In embodiments of the present disclosure, because the main body section 71 of the ejector 70 has an elongated pipe shape, an internal space of the main body section 71 is also provided in a passage shape that is long at a fixed length. Further, in the ejector 70, a nozzle section 75 is located inside the main body section 71. In embodiments of the present disclosure, the nozzle section 75 of the ejector 70 is formed in a tube shape that is elongated along the inside of the main body section 71. Thus, an internal passage of the nozzle section 75 is provided in a passage shape that is long at a fixed length. In this case, the nozzle section 75 may be provided in a structure that is elongated along the inside of the main body section 71 from one end to the other end of the main body section.

The nozzle section 75 located inside the main body section 71 has a structure connected to an end of the drive inlet section 72, and the internal passage of the nozzle section 75 is configured to communicate with the internal passage of the drive inlet section 72. In this case, a channel cross-sectional area of an outlet of the nozzle section 75 has a structure made smaller than an internal passage cross-sectional area of the drive inlet section 72. Further, the nozzle section 75 may have a tapered shape in which the cross-sectional area of the internal passage (the channel) thereof is gradually reduced toward the outlet-side end thereof. For example, the nozzle section 75 may be provided in a tubular shape having a circular cross-sectional shape, wherein an inner diameter thereof is gradually reduced toward the outlet-side end thereof.

In the intake passage section 52, a portion to which the outlet section 74 of the ejector 70 is coupled is provided with a recessed insertion section 53 into which the outlet section 74 can be inserted, and the outlet section 74 of the ejector 70 is inserted and coupled into the insertion section 53 of the intake passage section 52. In this case, an O-ring 54 for airtight maintenance may be press-fitted between an outer surface of the outlet section 74 of the ejector 70 and an inner surface of the insertion section 53 of the intake passage section 52.

The ejector 70 may have a flange section 77 protruding from an outer surface thereof for the purpose of mounting. The flange section 77 may be fastened to a fastening section 56 of the intake passage section 52 by a bolt 79 in a contact state. To this end, a fastening hole 78 through which the bolt 79 can pass is provided in the flange section 77 of the ejector 70, and a fastening hole 57 having threads on an inner circumferential surface thereof is formed in the fastening section 56 of the intake passage section 52.

Thereby, the outlet section 74 of the ejector 70 is fitted into the insertion section 53 of the intake passage section 52, and the flange section 77 of the ejector 70 comes into contact with the fastening section 56 of the intake passage section 52. Then, the bolt 79 is inserted into the fastening hole 78 formed in the flange section 77 of the ejector 70 flange section 77, and is screwed to the fastening hole 57 formed in the fastening section 56 of the intake passage section 52. Thereby, the ejector 70 may be fixed to the intake passage section 52.

In the ejector 70, the outlet section 74 is a portion that is formed integrally with the main body section 71. As illustrated in FIG. 4, the main body section 71 and the outlet section 74 in the ejector 70 may have no difference in shape or the like. However, of the two portions of the ejector 70, one inserted into the insertion section 53 of the intake passage section 52 may be called the outlet section 74, and the other located outside the insertion section 53 of the intake passage section 52 may be called the main body section 71.

An internal passage of the main body section 71 and an internal passage of the outlet section 74 communicate with each other, and both of the two internal passages may have a constant cross-sectional area in the whole range in a lengthwise direction. Further, the internal passage of the main body section 71 and the internal passage of the outlet section 74 may be formed to have the same cross-sectional area. For example, both of the two internal passages may communicate with each other with no step between an inner surface of the main body section 71 and an inner surface of the outlet section 74. In this case, the internal passage of the main body section 71 and the internal passage of the outlet section 74 may be passages having a circular cross section, and both of the two internal passages may have the same inner diameter.

In this way, the internal passage of the outlet section 74 may be formed with a constant cross-sectional area without a change in cross-sectional shape in a lengthwise direction. For example, the outlet section 74 may have a cylindrical shape having a constant inner diameter. In this case, air and a fuel evaporation gas that flow through the internal passage of the outlet section 74 are discharged through an outlet located in an end face of the outlet section 74.

In an embodiment of the present disclosure, the diffuser 55 may be formed in the intake passage section 52, and more specifically, may be formed to pass through the intake passage section 52 in the bottom of the insertion section 53 of the intake passage section 52. Thus, when the ejector 70 is coupled in a state in which the outlet section 74 is inserted into the insertion section 53 of the intake passage section 52, the outlet of the outlet section 74 is connected to an inlet of the diffuser 55 of the intake passage section 52. Thereby, the internal passage of the main body section 71, the internal passage of the outlet section 74, and an internal passage of the diffuser 55 formed in the intake passage section 52 become a communicating structure.

In this case, because the diffuser 55 is formed to pass through a wall of the intake passage section 52, an outlet of the diffuser 55 is located on the inner surface of the intake passage section 52. Thus, the air and the fuel evaporation gas flowing through the internal passage of the outlet section 74 may flow through the internal passage of the diffuser 55, and then be discharged into the intake passage section 52 through the outlet of the diffuser 55.

In the intake passage section 52, the diffuser 55 may be a portion where a cross-sectional area of the internal passage thereof is larger than a channel cross-sectional area of the outlet of the nozzle section 75. The diffuser 55 has a larger inner diameter than the nozzle section 75 in the whole range in a lengthwise direction of the internal passage thereof. With regard to a detailed shape, the diffuser 55 may have a shape in which a channel cross-sectional area thereof at an inlet thereof connected to the outlet of the outlet section 74 of the ejector 70 is gradually reduced toward the outlet (the downstream side) thereof, and then has a fixed cross-sectional area.

Further, the ejector 70 is provided with a suction section 71a, which is a portion connected with the suction inlet section 73, on one side (up in the figure) of the main body section 71. In the main body section 71, the suction section 71a may be located at the one end of the main body section 71.

Further, a check valve 76 is installed between an internal space of the suction section 71a and the internal passage of the suction inlet section 73. The check valve 76 serves to allow a fluid to flow from the suction inlet section 73 to the main body section 71 alone, and to stop a fluid from flowing from the main body section 71 to the suction inlet section 73.

The internal space of the suction section 71a and the internal passage of the suction inlet section 73 serve as a chamber that reduces pulsation noise generated when the PCSV 40 for purge is operated, and the check valve 76 is installed inside the chamber. Further, although not illustrated in FIG. 4, a sealing member for sealing may be press-fitted between both contact surfaces of the suction section 71a of the main body section 71 and the suction inlet section 73.

In the ejector 70, the nozzle section 75 has, as described above, the shape that is elongated along the internal passage of the main body section 71 from the end of the drive inlet section 72. Here, in the nozzle section 75, at least a part of the end side thereof including the outlet thereof may be located inside the internal passage of the outlet section 74. In this case, the outlet section 74 of the ejector 70 is located inside the insertion section 53 of the intake passage section 52, and thus a part of the end of the nozzle section 75 which is located in the internal passage of the outlet section 74 is also located inside the insertion section 53 of the intake passage section 52.

Further, the outlet of the nozzle section 75 located inside the outlet section 74 and the suction section 71a of the main body section 71 connected with the suction inlet section 73 are disposed apart from each other by a fixed distance. That is, in the conventional ejector 70, the outlet of the nozzle is located adjacent to the periphery of the suction section. However, in embodiments of the present disclosure, the outlet of the nozzle section 75 of the ejector 70 is located apart from the suction section 71a by a fixed distance.

As illustrated in FIG. 3, the drive inlet section 72 of the ejector 70 is connected to the intake passage section (e.g., the intake hose adjacent to the downstream end thereof) 64 adjacent to the rear end (downstream from the compressor in the direction of air flow) of the compressor 61 of the turbocharger through the recirculation line 69. The second purge line 39 of the purge line 36 extending from the purge port 32 of the canister 30 is connected to the suction inlet section 73 of the ejector 70. In this case, the outlet section 74 of the ejector 70 is, as described above, connected to the intake passage section (e.g., the intake hose adjacent to the front end thereof) 52 adjacent to the front end (upstream from the compressor in the direction of air flow) of the compressor 61 of the turbocharger.

Thus, the driving fluid in the ejector 70 becomes some of the air that is compressed by the compressor 61 and then is supplied to the drive inlet section 72 from the intake passage section 64 through the recirculation line 69, i.e., some of the supercharged air supplied to the engine. Further, the fluid suctioned into the ejector 70, i.e., the suctioned fluid, becomes the fuel evaporation gas (the purge gas) that is collected in the canister 30 and then is suctioned into the suction inlet section 73 through the purge line 36.

In the dual purge system according to an embodiment of the present disclosure, the ejector 70 may be installed on the intake hose of the upstream end of the compressor 61 as well as the air cleaner 51 of the upstream end of the compressor 61. Therefore, the intake passage section 52 on which the ejector 70 is installed refers to a passage portion through which suctioned air flows, such as the intake hose or the air cleaner 51.

In the ejector 70 of the dual purge system according to an embodiment of the present disclosure, the residual portions excluding the suction inlet section 73, i.e., the drive inlet section 72, the main body section 71, the nozzle section 75, and the outlet section 74 may be integrally formed as a whole.

Although the configuration of the dual purge system according to an embodiment of the present disclosure has been described, an operation state of the dual purge system will be described below with reference to FIGS. 5 and 6. FIG. 5 illustrates a purge operation state under conditions under which a negative pressure is formed in the engine intake system such as the surge tank 68, the intake manifold, etc. and the engine combustion chamber, and FIG. 6 illustrates a purge operation state under conditions under which a positive pressure other than the negative pressure is formed in the engine intake system.

Further, the operation state of FIG. 5 is an operation state when a turbocharger is not operated, and the operation state of FIG. 6 is an operation state when a turbocharger is operated. The turbocharger is usually operated under conditions under which a vehicle travels with a high load and on an uphill road.

As illustrated in FIG. 5, under conditions under which a negative pressure is formed in an engine intake system in a state in which the PCSV 40 is open, a fuel evaporation gas collected in the canister 30 by a pressure difference between the canister 30 (an atmospheric pressure) and the engine intake system (a negative pressure) is purged to the engine intake system through the main purge line 37 and the first purge line 38.

In contrast, as illustrated in FIG. 6, under conditions under which a positive pressure is formed in an engine intake system by an operation of a turbocharger in a state in which the PCSV 40 is open, a negative pressure is produced inside the ejector 70 by supplying supercharged air of the downstream end of the compressor 61 to the ejector 70 as a driving fluid, and a fuel evaporation gas collected in the canister 30 by a pressure difference between the negative pressure in the ejector 70 and an atmospheric pressure in the canister 30 is suctioned into the ejector 70 through the main purge line 37 and the second purge line 39, and then is purged to the engine intake system.

The operation state when the turbocharger is operated will be described in greater detail with reference to FIG. 6. When the turbocharger is operated, the compressor 61 located adjacent to the intake hose suctions and compresses air, and thereby the compressed air is supplied to a combustion chamber of an engine through the throttle valve 66 (air supercharged). In this case, some of the air compressed by the compressor 61 is supplied to the drive inlet section 72 of the ejector 70 from the intake passage section (the intake hose) 64 adjacent to the downstream end of the compressor 61 through the recirculation line 69.

Further, the air (the driving fluid) supplied to the drive inlet section 72 flows through the nozzle section 75 past the internal passage of the drive inlet section 72 at a high speed. The air flowing through the internal passage of the nozzle section 75 is discharged to the internal passage of the outlet section 74 through the outlet of the nozzle section, and then is discharged to the inside of the intake passage section (the intake hose) 52 adjacent to the upstream end of the compressor 61 past the internal passage of the diffuser 55 that passes through the inside and outside of the wall of the intake passage section 52.

In this case, a negative pressure is produced in the internal passage of the outlet section between the outlet of the nozzle section 75 and the outlet of the outlet section 74. This negative pressure is applied to the internal passage of the suction inlet section 73 through the internal space of the suction section 71a. Consequently, the fuel evaporation gas (the purge gas) in the canister 30 is suctioned into the suction inlet section 73 through the purge line 36 by the negative pressure.

In this way, the fuel evaporation gas (the purge gas or the suctioned fluid) suctioned into the suction inlet section 73 is suctioned into the internal passage of the main body section 71 past the check valve 76 and the internal space of the suction section 71a, is then mixed with air that is a driving fluid flowing through the nozzle section 75 in the internal passage of the outlet section 74, and is discharged into the intake passage section (the intake hose) 52 adjacent to the upstream end of the compressor 61 through the internal passage of the diffuser 55. Afterwards, the fuel evaporation gas is suctioned into the compressor 61 in the intake passage section 52 along with air, and then is supplied and burned to an engine along with the air (the supercharged air) compressed by the compressor 61.

Figure 7:
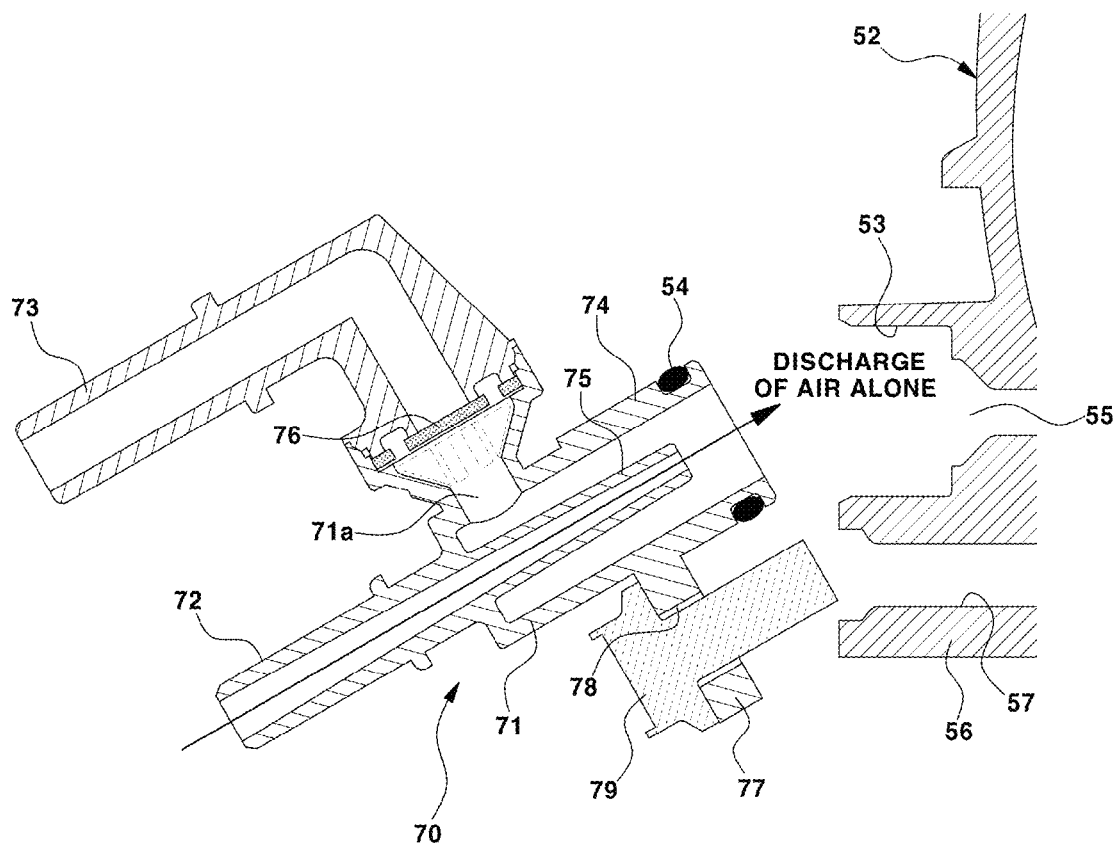
FIG. 7 is a view illustrating an abnormal state in which an ejector is demounted from an intake passage section in a dual purge system according to an embodiment of the present disclosure.

FIG. 7 is a view illustrating an abnormal state in which the ejector 70 is demounted and separated from the intake passage section 52. In an embodiment of the present disclosure, because the diffuser 55 for securing performance of a flow rate is located in the intake passage section 52, the diffuser 55 should be separated from the ejector 70 in the abnormal state illustrated in FIG. 7.

Especially, the diffuser 55 is not present in the ejector 70, and the suction section 71a is located apart from the outlet of the nozzle section 75 by a fixed distance. For this reason, in the abnormal state in which the ejector 70 is demounted and separated from the intake passage section 52, even if air, which is a driving fluid flows through the internal passages of the drive inlet section 72 and the nozzle section 75 and is discharged from the outlet of the nozzle section 75, a negative pressure is not produced in the internal passages of the outlet section 74 and the main body section 71.

Therefore, a negative pressure is also not produced in the suction section 71a, so that the fuel evaporation gas (the purge gas) is not suctioned through the suction inlet section 73. Further, because the fuel evaporation gas is not suctioned, only air is discharged through the outlet section 74 of the ejector 70, and the fuel evaporation gas is not discharged into the atmosphere.

Further, because the fuel evaporation gas is not suctioned into the ejector in the abnormal state in which the ejector 70 is demounted and separated from the intake passage section 52, it is possible to diagnose the abnormal state from information about a pressure in the fuel tank 20.

Figure 8:
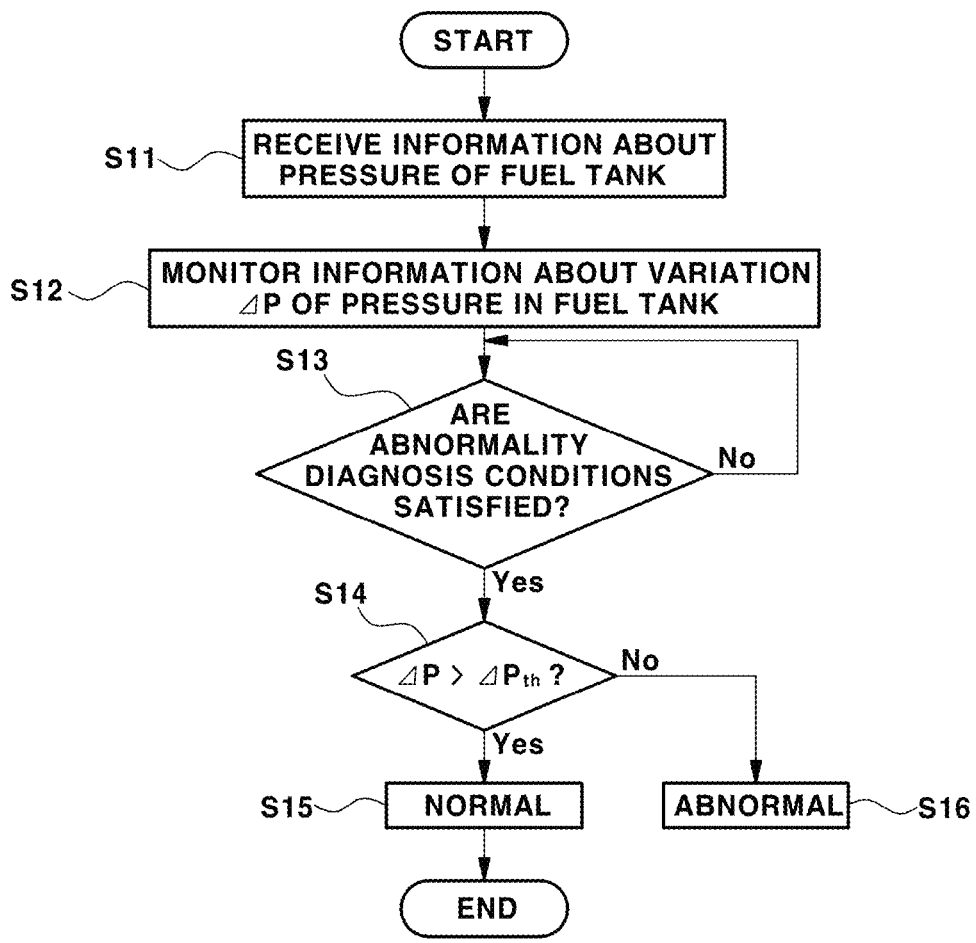
FIG. 8 is a flowchart illustrating a process of diagnosing abnormality in a state in which a dual purge system according to an embodiment of the present disclosure is applied.
Figure 9:
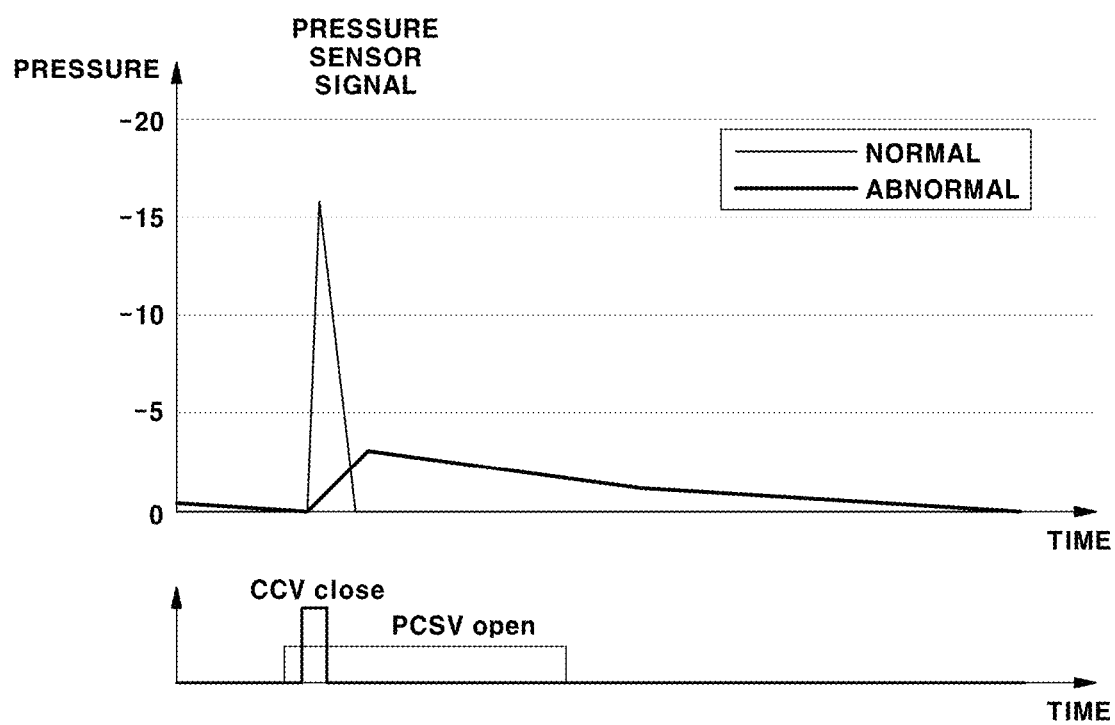
FIG. 9 is a view illustrating a comparison of signal values of a fuel tank pressure sensor in an abnormal state and a normal state in the process of diagnosing abnormality of the dual purge system according to an embodiment of the present disclosure.

FIG. 8 is a flow chart illustrating a process of diagnosing an abnormality of the dual purge system according to an embodiment of the present disclosure, and FIG. 9 is a view illustrating a comparison of signal values of a fuel tank pressure sensor in an abnormal state and a normal state in the process of diagnosing abnormality of the dual purge system according to an embodiment of the present disclosure.

Abnormality diagnosis of the dual purge system can be performed using a signal value of a pressure sensor 21 installed on the fuel tank 20 (hereinafter referred to as a "fuel tank pressure sensor"). The fuel tank pressure sensor 21 is a sensor that detects a pressure in the fuel tank 20, and is connected to the control unit 10 such that signal input is possible. Thus, when the fuel tank pressure sensor 21 outputs an electric signal according to a detected value, the control unit 10 can receive this electric signal, and the control unit 10 can diagnose an abnormal state in which the ejector 70 is demounted and separated from the intake passage section 52 using this electric signal.

The control unit 10 diagnoses an abnormal state using information about a pressure in the fuel tank 20 which is detected by the fuel tank pressure sensor 21 at a point in time when the CCV 34 is closed when a turbocharger is operated. To this end, the control unit 10 monitors a variation of the pressure in the fuel tank 20 from a signal of the fuel tank pressure sensor 21 during vehicle traveling, compares a variation of pressure at a point in time when the turbocharger is operated and the CCV 34 is closed with a preset threshold, and determines a state in which the pressure variation is more than or equal to the threshold to be an abnormal state in which suction and purge of a fuel evaporation gas in the canister 30 are not performed due to demounting of the ejector 70.

Referring to FIG. 8 for description, the control unit 10 receives a signal of the fuel tank pressure sensor 21 during vehicle traveling, and obtains and monitors information about a real-time pressure in the fuel tank 20 from the received signal of the fuel tank pressure sensor 21 (S11). Further, the control unit 10 checks and monitors information about a pressure variation from the information about a real-time pressure in the fuel tank 20 (S12).

Next, the control unit 10 determines whether to satisfy fixed abnormality diagnosis conditions for the dual purge system (S13). Here, the abnormality diagnosis conditions include a state in which all of the PCSV 40, the CCV 34, and the fuel tank pressure sensor 21 are normal, a state in which an engine boost pressure exceeds a preset pressure, a state in which fixed high load purge control activation conditions are satisfied, and a state in which the CCV 34 is closed.

Normality or not of the PCSV 40, the CCV 34, and the fuel tank pressure sensor 21 may be checked from results of an ordinary abnormality diagnosis logic that is separately performed. Further, the boost pressure is a pressure of air supplied to an engine by a turbocharger. The boost pressure may be detected by a boost pressure sensor 65, and the control unit 10 receives and monitors a signal of the boost pressure sensor 65. In addition, the high load purge control activation conditions include a condition in which the PCSV is open, and a condition in which the turbocharger is in operation.

When the abnormality diagnosis conditions are satisfied (Yes at S13), the control unit 10 compares a variation $\Delta P$ of a pressure in the fuel tank 20, which is obtained from a signal of the fuel tank pressure sensor 21 in real time, with a threshold $\Delta P_{th}$ (S14). When the CCV 34 is closed when the turbocharger is operated, the pressure in the fuel tank 20 which is in a negative pressure state is dropped to a lower pressure. Therefore, the pressure change state while the CCV 34 is closed is a pressure drop state other than a pressure rise. In this case, a monitored pressure variation becomes a pressure drop amount.

Thus, in the abnormality diagnosis process, the control unit 10 compares a variation $\Delta P$ of a current pressure in the fuel tank 20 with a threshold $\Delta P_{th}$, and determines whether the variation of a current pressure is greater than the threshold. In this case, when the variation $\Delta P$ of a current pressure is greater than the threshold $\Delta P_{th}$ ($\Delta P > \Delta P_{th}$) (Yes at S14), it is determined that the dual purge system including the ejector 70 is in a normal state (S15).

In contrast, if the variation of a current pressure is smaller than or equal to the threshold ($\Delta P \leq \Delta P_{th}$) (No at S14), this is diagnosed as an abnormal state in which the ejector 70 is demounted and separated from the intake passage section 52 (S16). If there is not the abnormal state in which the ejector 70 is demounted and separated in a checkup process after the abnormality diagnosis, it may be diagnosed that a state of the recirculation line 69 or the second purge line 39 that is a high load purge line is abnormal.

In FIG. 9, signal values of the fuel tank pressure sensor 21, especially values of the pressure in the fuel tank 20 in a normal state and an abnormal state are illustrated. As illustrated, it can be found that the value of the pressure in the fuel tank 20 in a normal state is sharply raised, and that, in the case of the abnormal state, the variation $\Delta P$ of the pressure in the fuel tank 20 is relatively small. Thus, when the variation $\Delta P$ of the pressure in the fuel tank 20 is smaller than or equal to the fixed threshold $\Delta P_{th}$, this can be determined to be the abnormal state.

With this configuration, in the dual purge system according to embodiments of the present disclosure, an internal structure of the ejector 70 is improved such that the diffuser 55, which communicates with the internal passages of the nozzle section 75 and the outlet section 74 of the ejector 70 and has an enlarged passage cross-sectional area compared to the channel cross-sectional area of the outlet of the nozzle section 75, is formed in the intake passage section 52 to which the outlet section 74 of the ejector 70 is connected, and such that the suction section 71a, which is a space into which the fuel evaporation gas is suctioned through the suction inlet section 73 of the main body section 71 of the ejector 70, and the outlet of the nozzle section 75 are disposed at positions apart from each other above a fixed distance. Thereby, the abnormal state in which the outlet section 74 of the ejector 70 is demounted and separated from the intake passage section 52 can be diagnosed.

Further, in the abnormal state in which the ejector 70 is demounted and separated from the intake passage section 52, even if compressed air that is a driving fluid is supplied to the ejector 70, the suction and the atmospheric discharge of the fuel evaporation gas in the canister 30 are made impossible at the ejector 70.

Although the embodiments of the present disclosure have been described in detail, the scope of the prevent disclosure is not limited to these embodiments, and various modifications and improvements devised by those skilled in the art using the fundamental subject matter of the present disclosure, which is defined by the appended claims, further fall within the scope of the present disclosure.

What is claimed is:

1. A dual purge system for a vehicle, the dual purge system comprising:
an ejector comprising:
a main body section;
a drive inlet section connected to a first end of the main body section;
a suction inlet section connected to a first side of the main body section;
an outlet section configured to be coupled to an intake passage section of an engine intake system;
a nozzle section inside the main body section; and
a diffuser disposed in the intake passage section, wherein the diffuser is configured to communicate with internal passages of the main body section and the outlet section and has a larger passage cross-sectional area than a channel cross-sectional area of an outlet of the nozzle section;

wherein the ejector is configured to supply a driving fluid to flow through the drive inlet section;

wherein, in response to a negative pressure being produced in the main body section by the driving fluid that flows through and moves the nozzle section, the suction inlet section is configured to suction a fuel evaporation gas from a canister connected through a purge line;

wherein the outlet section of the ejector is configured to discharge the driving fluid that flows through the nozzle section in the ejector and the fuel evaporation gas suctioned through the suction inlet section;

wherein a recessed insertion section is formed in the intake passage section, and the outlet section of the ejector is coupled to the intake passage section in a state inserted into the insertion section of the intake passage section; and wherein the outlet section is located inside the insertion section of the intake passage section, and the outlet of the nozzle section located in the internal passage of the outlet section is located inside the insertion section of the intake passage section.

2. The dual purge system of claim 1, wherein:
the nozzle section has a tube shape that extends along an inside of the main body section from a second end toward the first end of the main body section; and
the suction inlet section is connected to a suction section disposed at the first side of the main body section.

3. The dual purge system of claim 2, wherein:
the main body section has a pipe shape of a predetermined length;
the drive inlet section is configured to communicate with an internal passage of the nozzle section; and
the outlet section is connected to the second end of the main body section.

4. The dual purge system of claim 2, wherein an end of the nozzle section having the outlet is provided in the outlet section which is connected to the second end of the main body section.

5. The dual purge system of claim 2, wherein the nozzle section has a tapered shape in which a cross-sectional area of an internal passage of the nozzle section is gradually reduced toward an end of the nozzle section at which the outlet of the nozzle section is located.

6. The dual purge system of claim 1, wherein the intake passage section is a suctioned air passage portion configured such that air suctioned by a compressor of a turbocharger flows through the suctioned air passage portion, the intake passage section being located at an upstream end of the compressor.

7. The dual purge system of claim 6, wherein the drive inlet section is connected to the intake passage section of a downstream end of the compressor through a recirculation line so as to allow air compressed by the compressor of the turbocharger to be supplied to the drive inlet section.

8. The dual purge system of claim 1, wherein:
the diffuser passes through a wall of the intake passage section from the insertion section; and
an internal passage of the diffuser is configured to communicate with an inside of the intake passage section.

9. The dual purge system of claim 8, wherein the diffuser includes a portion having a channel cross-sectional area that is gradually reduced from an inlet portion of the diffuser connected to the outlet of the outlet section toward an outlet of the diffuser.

10. A method of providing a dual purge system for a vehicle, the method comprising:

providing an ejector, wherein providing the ejector comprises:
connecting a drive inlet section to a first end of a main body section;
connecting a suction inlet section to a first side of the main body section;
coupling an outlet section to an intake passage section;
providing a nozzle section inside the main body section; and
disposing a diffuser in the intake passage section, wherein the diffuser communicates with internal passages of the main body section and the outlet section and has a larger passage cross-sectional area than a channel cross-sectional area of an outlet of the nozzle section;
flowing a driving fluid through the drive inlet section;
suctioning a fuel evaporation gas from a canister connected through a purge line by the suction inlet section, in response to a negative pressure being produced in the main body section by the driving fluid flowing through and moving the nozzle section; and
discharging the driving fluid that flows through the nozzle section and the fuel evaporation gas suctioned through the suction inlet section;
wherein the intake passage section comprises a recessed insertion section, and wherein the method further comprises inserting the outlet section into the insertion section to couple the outlet section and the intake passage section; and
wherein the outlet section is located inside the insertion section of the intake passage section, and the outlet of the nozzle section located in the internal passage of the outlet section is located inside the insertion section of the intake passage section.

11. The method of claim 10, wherein:
the nozzle section has a tube shape that extends along an inside of the main body section from a second end toward the first end of the main body section; and
the suction inlet section is connected to a suction section disposed at the first side of the main body section.

12. The method of claim 11, wherein:
the main body section has a pipe shape of a predetermined length;
the drive inlet section communicates with an internal passage of the nozzle section; and
the outlet section is connected to the second end of the main body section.

13. The method of claim 11, wherein an end of the nozzle section having the outlet is provided in the outlet section which is connected to the second end of the main body section.

14. The method of claim 11, wherein the nozzle section has a tapered shape in which a cross-sectional area of an internal passage of the nozzle section is gradually reduced toward an end of the nozzle section at which the outlet of the nozzle section is located.

15. The method of claim 10, wherein the intake passage section is a suctioned air passage portion in which air suctioned by a compressor of a turbocharger flows through the suctioned air passage portion, the intake passage section being located at an upstream end of the compressor.

16. The method of claim 15, wherein the drive inlet section is connected to the intake passage section of a downstream end of the compressor through a recirculation line so as to allow air compressed by the compressor of the turbocharger to be supplied to the drive inlet section.

17. The method of claim 10, wherein:
the diffuser passes through a wall of the intake passage section from the insertion section; and
an internal passage of the diffuser communicates with an inside of the intake passage section.

18. The method of claim 17, wherein the diffuser includes a portion having a channel cross-sectional area that is gradually reduced from an inlet portion of the diffuser connected to the outlet of the outlet section toward an outlet of the diffuser.

19. The method of claim 18, wherein:
the nozzle section has a tube shape that extends along an inside of the main body section from a second end toward the first end of the main body section; and
the suction inlet section is connected to a suction section disposed at the first side of the main body section.

20. A method of operating a dual purge system for a vehicle comprising an ejector having: a main body section; a drive inlet section connected to a first end of the main body section; a suction inlet section connected to a first side of the main body section; an outlet section configured to be coupled to an intake passage section of an engine intake system; a nozzle section inside the main body section; and a diffuser disposed in the intake passage section, wherein the diffuser is configured to communicate with internal passages of the main body section and the outlet section and has a larger passage cross-sectional area than a channel cross-sectional area of an outlet of the nozzle section, wherein a recessed insertion section is formed in the intake passage section, and the outlet section of the ejector is coupled to the intake passage section in a state inserted into the insertion section of the intake passage section, the outlet section is located inside the insertion section of the intake passage section, and the outlet of the nozzle section located in the internal passage of the outlet section is located inside the insertion section of the intake passage section, the method comprising:
supplying, but the ejector, a driving fluid to flow through the drive inlet section;
in response to a negative pressure being produced in the main body section by the driving fluid that flows through and moves the nozzle section, suctioning, by the suction inlet section, a fuel evaporation gas from a canister connected through a purge line; and
discharging, by the outlet section of the ejector, the driving fluid that flows through the nozzle section in the ejector and the fuel evaporation gas suctioned through the suction inlet section.

* * * * *